US011981568B2

(12) United States Patent
Yuge et al.

(10) Patent No.: US 11,981,568 B2
(45) Date of Patent: May 14, 2024

(54) MEMBER FOR CONTINUOUS PRODUCTION OF CARBON NANOBRUSH, AND METHOD FOR CONTINUOUS PRODUCTION OF CARBON NANOBRUSH

(71) Applicant: NEC Corporation, Tokyo (JP)

(72) Inventors: Ryota Yuge, Tokyo (JP); Hideyuki Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 485 days.

(21) Appl. No.: 17/426,224

(22) PCT Filed: Jan. 27, 2020

(86) PCT No.: PCT/JP2020/002778
§ 371 (c)(1),
(2) Date: Jul. 28, 2021

(87) PCT Pub. No.: WO2020/158665
PCT Pub. Date: Aug. 6, 2020

(65) Prior Publication Data
US 2022/0098041 A1  Mar. 31, 2022

(30) Foreign Application Priority Data

Jan. 29, 2019  (JP) ................................ 2019-012995

(51) Int. Cl.
*C01B 32/18* (2017.01)
*B01J 19/12* (2006.01)
(Continued)

(52) U.S. Cl.
CPC ............ *C01B 32/18* (2017.08); *B01J 19/121* (2013.01); *B01J 35/40* (2024.01); *B01J 35/50* (2024.01);
(Continued)

(58) Field of Classification Search
CPC . C01B 32/18; C01B 2204/22; C01B 2204/32; B01J 19/121; B01J 35/40;
(Continued)

(56) References Cited

U.S. PATENT DOCUMENTS 10,793,439 B2  10/2020  Yuge
10,971,734 B2   4/2021  Yuge
(Continued)

FOREIGN PATENT DOCUMENTS

JP   2005350275 A   12/2005
JP   6179678 82     8/2017
(Continued)

OTHER PUBLICATIONS

Opinion of the International Search Authority in PCT/JP2020/002778 (dated Apr. 7, 2020) (Year: 2020).*
(Continued)

*Primary Examiner* — Daniel C. McCracken
(74) *Attorney, Agent, or Firm* — Sughrue Mion, PLLC

(57) ABSTRACT

An object of the present invention is to provide a member and a method for producing a fibrous carbon nanohorn aggregate with high efficiency. According to an embodiment of the present invention, there is provided a carbon nanohorn aggregate production member for producing a fibrous carbon nanohorn aggregate in which single-walled carbon nanohorns are aggregated radially and are connected in a fibrous form, comprising: a target fixing jig having a target housing section on an upper surface which has a partition and is capable of mounting a plurality of rod-shaped catalyst-containing carbon targets without making a mutual contact, and a jig guide for movement on a side surface; a jig for target fixing jig movement which is slidably engaged with the jig guide for movement; and a target fixing jig guide which is inclined downward, and is equipped with a guide (Continued)

rail which is adapted to an arrangement of the plurality of rod-shaped catalyst-containing carbon targets, wherein the target fixing jig is slidably engaged with the guide rail, and moves in a downward direction by a weight thereof and in a transverse direction along the guide rail by the jig for target fixing jig movement.

6 Claims, 5 Drawing Sheets

(51) Int. Cl.
    *B01J 35/40*     (2024.01)
    *B01J 35/50*     (2024.01)

(52) U.S. Cl.
    CPC ...... *C01B 2204/22* (2013.01); *C01B 2204/32* (2013.01); *C01P 2004/03* (2013.01); *C01P 2004/04* (2013.01)

(58) Field of Classification Search
    CPC .......... B01J 35/50; B01J 23/745; B01J 23/74; C01P 2004/03; C01P 2004/04; B82Y 30/00; B82Y 40/00
    See application file for complete search history.

(56) References Cited

U.S. PATENT DOCUMENTS

| | | | |
|---|---|---|---|
| 2006/0133979 A1 | 6/2006 | Azami et al. | |
| 2006/0191781 A1 | 8/2006 | Azami et al. | |
| 2007/0003468 A1 | 1/2007 | Azami et al. | |
| 2007/0003469 A1 | 1/2007 | Azami et al. | |
| 2007/0025905 A1 | 2/2007 | Azami et al. | |
| 2018/0105425 A1 | 4/2018 | Yuge | |
| 2019/0081330 A1 | 3/2019 | Yuge | |
| 2020/0216321 A1* | 7/2020 | Yuge | ...................... C04B 35/52 |
| 2021/0229999 A1 | 7/2021 | Yuge | |

FOREIGN PATENT DOCUMENTS

| | | | | |
|---|---|---|---|---|
| WO | 2004069743 A1 | | 8/2004 | |
| WO | 2004096705 A1 | | 11/2004 | |
| WO | 2004103902 A1 | | 12/2004 | |
| WO | 2004113225 A1 | | 12/2004 | |
| WO | 2005019103 A1 | | 3/2005 | |
| WO | 2016147909 A1 | | 9/2016 | |
| WO | 2017159351 A1 | | 9/2017 | |
| WO | WO 2019/030890 | * | 2/2019 | ............. C01B 32/18 |
| WO | 2019229841 A1 | | 12/2019 | |

OTHER PUBLICATIONS

U.S. Office Action and PTO-892 for U.S. Appl. No. 17/059,086 dated Mar. 25, 2022.
Pan, Z. W., et al. "Very long carbon nanotubes." Nature 394. 6694 (1998): 631-632.
Cheng, Meng-Dawn, et al. "Formation studies and controlled production of carbon nanohorns using continuous in situ characterization techniques." Nanotechnology 18.18 (2007): 185604.
International Search Report for PCT Application No. PCT/JP2020/002778, dated Apr. 7, 2020.
R. Yuge et al., "Structure and Electrical Properties of Fibrous Aggregates of Carbon Nanohorns", Extended Abstracts of The 63rd JSAP Spring Meeting 2016. Mar. 3, 2016, pp. 14_115.
R. Yuge et al., "Preparation and Characterization of Newly Discovered Fibrous Aggregates of Single-Walled Carbon Nanohorns", Advanced Materials, vol. 28, No. 33, May 25, 2016, pp. 7174-7177.
T. Azami et al., "Large-Scale Production of Single-Wall Carbon Nanohorns with High Purity", J. Phys. Chem. C, 2008, 112, pp. 1330-1334.
R. Yuge et al., "Preparation and Characterization of Fibrous Aggregates of Single-Walled Carbon Nanohorns", Abstracts of The 49th Fullerenes-Nanotubes-Graphene General Symposium, 1P-22. Sep. 7, 2015, pp. 65.
R. Yuge et al., "Characterization and Supercapacitor Properties of Fibrous Aggregates of Single-Walled Carbon Nanohorns", Abstract of The 50th Fullerenes-Nanotubes-Graphene General Symposium, 1P-43, Feb. 19, 2016, pp. 83.

* cited by examiner

MEMBER FOR CONTINUOUS PRODUCTION OF CARBON NANOBRUSH, AND METHOD FOR CONTINUOUS PRODUCTION OF CARBON NANOBRUSH

This application is a National Stage Entry of PCT/JP2020/002778 filed on Jan. 27, 2020, which claims priority from Japanese Patent Application 2019-012995 filed on Jan. 29, 2019, the contents of all of which are incorporated herein by reference, in their entirety.

TECHNICAL FIELD

The present invention relates to a carbon nanohorn aggregate production member for producing a carbon nanohorn aggregate including a carbon nanobrush, and a method for producing a carbon nanohorn aggregate including a carbon nanobrush.

BACKGROUND ART

So far, carbon materials have been used as materials such as an electroconductive material, a catalyst carrier, an adsorbent, a separating agent, an ink, and a toner, and in recent years, with an advent of nanocarbon materials having a nano size, such as carbon nanotubes and carbon nanohorn aggregates, characteristics thereof as a structure have been attracting attention.

In recent years, a fibrous carbon nanohorn aggregate (also called as "carbon nanobrush", and hereinafter referred to as "CNB" in short) having a structure in which carbon nanohorns are aggregated radially and connected in a fibrous form was discovered, which differs from the conventional spherical carbon nanohorn aggregate (hereinafter, referred to as "CNHs" in short) (Patent literature 1). The CNB stands out for a high dispersibity and a high adsorptivity, and furthermore, has a high electroconductivity. Accordingly, it has been expected to be applied to an electroconductive material of a lithium-ion battery, a high-capacity electrical double-layer capacitor electrode, a polymeric actuator electrode, a sensor electrode, a catalyst carrier, a composite and the like.

CITATION LIST

Patent Literature

Patent Literature 1: Japanese Patent No. 6179678

SUMMARY OF INVENTION

Technical Problem

Patent Literature 1 has described a method for producing a CNB in which laser ablation is carried out while rotating a target in a container in which a catalyst-containing carbon target is set. Although the CNB is produced together with the CNHs, and in the method according to Patent Literature 1, a proportion of the CNB in a product material was extremely small. Furthermore, in the method according to the Patent Literature 1, since a catalyst in the vicinity of laser irradiation marks is evaporated and heat-affected zone of carbon is formed, the CNB could not be prepared continuously. Moreover, after the target is evaporated, since there is a need to replace the target newly, the CNB could not be prepared with high efficiency. An object of the present invention is to provide a member and a method for producing a CNB with high efficiency in view of the abovementioned issues.

Solution to Problem

According to one embodiment of the present invention, there is provided a carbon nanohorn aggregate production member for producing a fibrous carbon nanohorn aggregate in which single-walled carbon nanohorns are aggregated radially and are connected in a fibrous form, comprising:
a target fixing jig having (i) a target housing section on an upper surface which has a partition and is capable of mounting a plurality of rod-shaped catalyst-containing carbon targets without making a mutual contact, and (ii) a jig guide for movement on a side surface;
a jig for target fixing jig movement which is slidably engaged with the jig guide for movement, and
a target fixing jig guide which is inclined downward, and is equipped with
a guide rail which is adapted to an arrangement of the plurality of rod-shaped catalyst-containing carbon targets, wherein
the target fixing jig is slidably engaged with the guide rail, and moves in a downward direction by a weight thereof and in a transverse direction along the guide rail by the jig for target fixing jig movement.

According to one embodiment of the present invention, there is provided a method for producing a carbon nanohorn aggregate including fibrous carbon nanohorn aggregate in which single-walled carbon nanohorns are aggregated radially and are connected in a fibrous form, comprising:
a step (a) of mounting a plurality of rod-shaped catalyst-containing carbon targets on a target fixing jig having (i) a target housing section on an upper surface which has a partition and is capable of mounting a plurality of rod-shaped catalyst-containing carbon targets without making a mutual contact, and (ii) a jig guide for movement on a side surface,
a step (b) of fixing end portions of the plurality of rod-shaped catalyst-containing carbon targets to the target fixing jig, a step (c) of connecting the jig guide for movement on the side surface of the target fixing jig and a jig for target fixing jig movement, a step (d) of installing the target fixing jig on the target fixing jig guide which is inclined downward, and is equipped with a guide rail which is adapted to an arrangement of the plurality of rod-shaped catalyst-containing carbon targets,
a step (e) of irradiating laser light to one of the rod-shaped catalyst-containing carbon targets, and
a step (f) of moving the target fixing jig along the guide rail by the jig for target fixing jig movement, thereby moving a position at which the laser light is irradiated on the rod-shaped catalyst-containing carbon target so that all of the plurality of rod-shaped catalyst-containing carbon targets are irradiated with the laser light.

Advantageous Effect of Invention

According to an embodiment of the present invention, it is possible to produce a CNB with high efficiency.

DESCRIPTION OF EMBODIMENTS (CNB)

Figure 1:
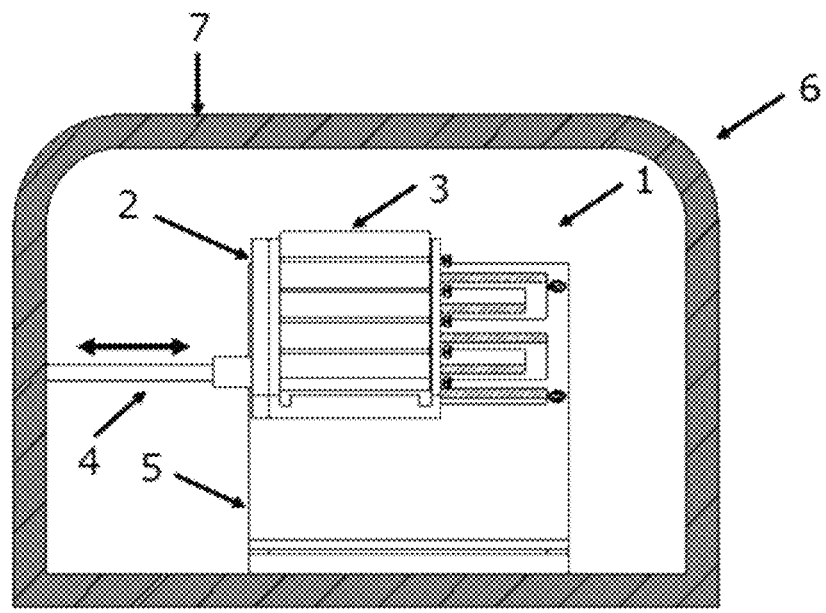
FIG. 1 is a schematic diagram (front view) showing a production apparatus 6 in which a production member 1 according to the present embodiment is installed.

A CNB which is produced in the present embodiment will be described below. A CNB has a structure in which carbon nanohorn aggregates of a seed type, a bud type, a dahlia type, a petal dahlia type, and a petal type (graphene sheet structure) are connected one-dimensionally. In other words, a CNB has a structure in which single-walled carbon nanohorns are aggregated radially, and are connected in fibrous form. Consequently, carbon nanohorn aggregates of one type or in plurality are included in the fibrous structure. The seed type is a shape in which few or no horn-shaped protrusion is found on a surface of the fibrous structure, the bud type is a shape in which some horn-shaped protrusions are found on the surface of the fibrous structure, the dahlia type is a shape in which a number of horn-shaped protrusions are found on the surface of the fibrous structure, and the petal type is a shape in which protrusions having a shape of flower petals (graphene sheet structure) are found on the surface of the fibrous structure. The petal dahlia type is an intermediate structure of the dahlia type and the petal type. A CNB is to be a structure in which the single-walled carbon nanohorns are aggregated, and is not restricted to the above-mentioned structures.

A diameter of each single-walled carbon nanohorn is approximately in a range of 1 nm to 5 nm, and a length thereof is in a range of 30 nm to 100 nm. A CNB generally has a diameter in a range of about 30 nm to 200 nm, and a length in a range of about 1 μm to 100 μm. On the other hand, a CNHs generally has a diameter in a range of about 30 nm to 200 nm, and has almost a uniform size.

Moreover, an interior of a CNB sometimes includes a carbon nanotube. For this reason, a CNB may be prepared by the following mechanism for preparation. That is, (1) a carbon target is heated rapidly by laser irradiation, and accordingly, carbon and a catalyst are vaporized at once from the carbon target, thereby forming a plume by high-density carbon evaporation. (2) At this time, the carbon forms carbon droplets of a size uniform to some extent by mutual collision. (3) In the process of the carbon droplets getting diffused, graphitization of carbon cooling gradually progresses, and a carbon nanohorn in the form of a tube is formed. A carbon nanotube is also developed from a catalyst dissolved in the carbon droplets at this time. Thereafter, (4) with the carbon nanotube made as a template, a radial structure of the carbon nanohorn is connected one-dimensionally, and the CNB is formed.

The CNB is described in detail in Patent Literature 1. The entire disclosure of Patent Literature 1 is incorporated in the present description by reference.

Next, a method of producing a CNB according to the present embodiment will be described below. Generally, a CNB is obtained by carrying out laser ablation on a catalyst-containing carbon target in a predetermined container. In the present embodiment, a CNB is produced continuously and efficiently from a plurality of rod-shaped catalyst-containing targets 3 by using a production member 1.

(Catalyst-Containing Carbon Target)

In the present embodiment, a rod-shaped catalyst-containing carbon target 3 is used as the catalyst-containing carbon target. When the rod-shaped catalyst-containing carbon target 3 is subjected to laser irradiation, it is possible to prepare a CNB efficiently without generating much of affected zone.

It is possible to prepare the rod-shaped catalyst-containing target 3 by mixing uniformly fine particles of a catalytic metal and carbon powder, and thereafter forming the mixture in rod form. An amount of the CNB prepared varies according to an amount of catalyst included in the rod-shaped catalyst-containing carbon target 3. The amount of catalyst in the rod-shaped catalyst-containing target 3 may be selected appropriately, and the amount of catalyst is in a range of preferably 0.3 to 20 atom % (at. %), more preferably 0.5 to 3 at. %. When the amount of catalyst is smaller than 0.3 at. %, the amount of CNB prepared becomes extremely small. When the amount of catalyst exceeds 20 at. %, the amount of catalyst becomes large, thereby leading to an increase in cost, and therefore not appropriate. As a catalyst, it is possible to use Fe, Ni, and Co singly or upon mixing. It is preferable to use Fe (iron) singly, and it is particularly preferable to use the rod-shaped catalyst-containing carbon target 3 containing iron in a range of 1 at. % to 3 at. %.

Physical properties (thermal conductivity, density, hardness and the like) of the rod-shaped catalyst-containing target 3 sometimes have an effect on the preparation of CNB. The rod-shaped catalyst-containing carbon target 3 which has a low thermal conductivity and a low density, and which is soft is favorable. A preferable bulk density of the rod-shaped catalyst-containing carbon target 3 is 1.6 g/cm$^3$ or lower, and bulk density of 1.4 g/cm$^3$ or lower is more preferable. A preferable thermal conductivity of the rod-shaped catalyst-containing carbon target 3 is 15 W/(m·K) or lower, and thermal conductivity of 14 W/(m·K) or lower is more preferable. The bulk density and the thermal conductivity in this range makes it possible to improve a yield of CNB. In a case where the bulk density and the thermal conductivity exceed these ranges, sometimes a yield of CNHs and other carbon structures increases and the yield of CNB is declined.

(Production Member)

Figure 2:
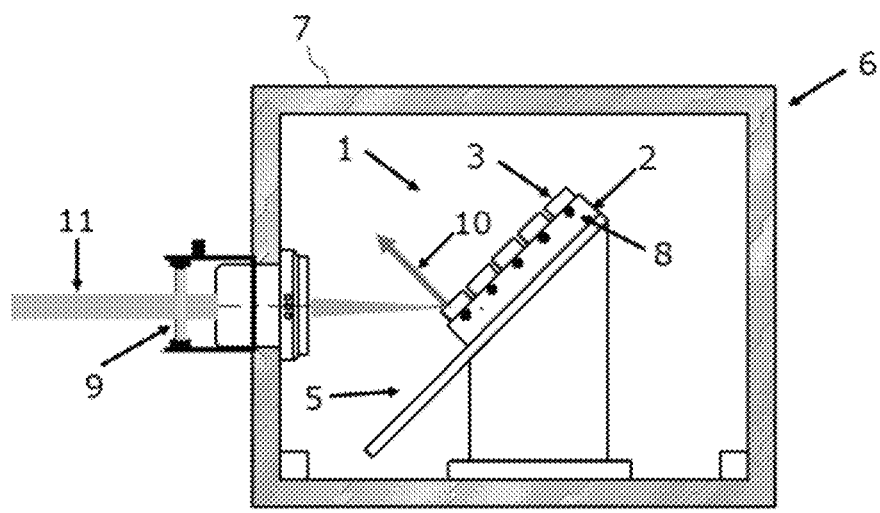
FIG. 2 is a schematic diagram (side view) showing the production apparatus 6 in which the production member 1 according to the present embodiment is installed.

In the method for producing the CNB according to the present embodiment, first of all, the rod-shaped catalyst-containing carbon target 3 is mounted on a production member 1, and the mounting is installed in a production apparatus 6 (FIG. 1 and FIG. 2). FIG. 1 and FIG. 2 are respectively a front view and a side view of the production apparatus 6 in which the production member 1 is installed. The production member 1 has a target fixing jig 2 on which the plurality of rod-shaped catalyst-containing carbon target 3 is mounted, a jig for target fixing jig movement 4, and a target fixing jig guide 5. As shown in FIG. 2, laser light 11 is irradiated to the rod-shaped catalyst-containing carbon targets 3 and the CNB is produced. In the present embodiment, a direction of the laser light 11 is to be set to be the same all the time. The rod-shaped catalyst-containing carbon targets 3 are moved together with the target fixing jig 2, thereby moving a position at which the laser light 11 is irradiated to the rod-shaped catalyst-containing carbon targets 3, and a CNB is produced from the rod-shaped catalyst-containing targets 3.

Figure 3:
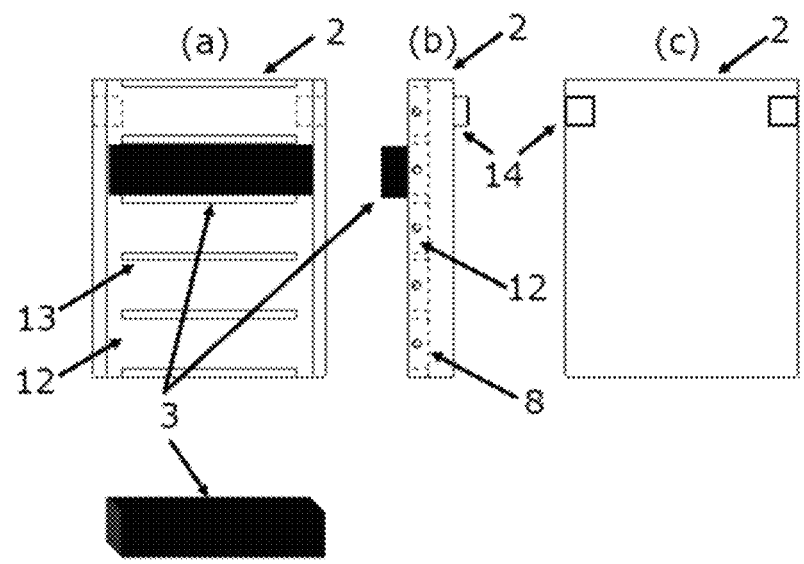
FIG. 3 is a schematic diagram ((a) top view, (b) cross-sectional view, and (c) bottom view) of a target fixing jig 2.

FIG. 3 shows (a) an upper view, (b) a side view, and (c) a bottom view of the target fixing jig 2. The target fixing jig 2 has, on an upper surface thereof, a target housing section 12, and the target housing section 12 has partitions 13 separating each of the rod-shaped catalyst-containing carbon targets 3, thereby preventing the plurality of rod-shaped catalyst-containing carbon targets 3 from making a mutual contact. Accordingly, it is possible to prevent the heat imparted by the laser light 11 from being conducted to the rod-shaped catalyst-containing carbon target 3 which is not irradiated, and to improve the yield of the CNB. The rod-shaped catalyst-containing carbon targets 3 are preferably to be disposed to be mutually parallel. Moreover, the rod-shaped catalyst-containing targets 3 are preferably to be disposed at a uniform interval.

The number of rod-shaped catalyst-containing carbon targets 3 to be mounted on the target fixing jig 2 is not restricted in particular. The number of rod-shaped catalyst-containing carbon targets 3 to be mounted on the target fixing jig 2 may be set appropriately to a range such as 1 to 5 and 1 to 30. Although there is no restriction in particular on a distance between the adjacent rod-shaped catalyst-containing carbon targets 3, from a viewpoint of disposing as many rod-shaped catalyst-containing carbon targets 3 as possible on the target fixing jig 2, the narrow distance is preferable. However, from a viewpoint of reducing an effect of heat from the adjacent rod-shaped catalyst-containing carbon target 3, it is preferable to keep a distance to some extent. For instance, it is possible to keep the distance between the adjacent rod-shaped catalyst-containing carbon targets 3 in a range of 1 mm to 10 mm.

It is preferable that a base material of the target fixing jig 2 is composed of a material having a favorable heat dissipation property, and may include a material of one type such as, a metal selected from stainless steel, copper (Cu), aluminum (Al), tungsten (W), molybdenum (Mo), and chromium (Cr), an alloy which includes these metals, ceramics, diamond, and a complex of the abovementioned metals or alloys.

For fixing the rod-shaped catalyst-containing carbon target 3 tightly, an end portion of the rod-shaped catalyst-containing carbon target 3 may be fixed to the target fixing jig 2 by a target setting screw 8. In this case, a hole for inserting the target setting screw 8 is to be provided on a side surface of the target fixing jig 2.

The target fixing jig 2 has a guide member 14 on a lower surface thereof. The target fixing jig 2 is slidably engaged with a guide rail 15 which is provided to the target fixing jig guide 5 via the guide member 14. Accordingly, the target fixing jig 2 is to move along the guide rail 15. Although it is not restricted in particular, the guide member 14 may be a protrusion as shown in FIGS. 3(*b*) and (*c*).

Figure 4:
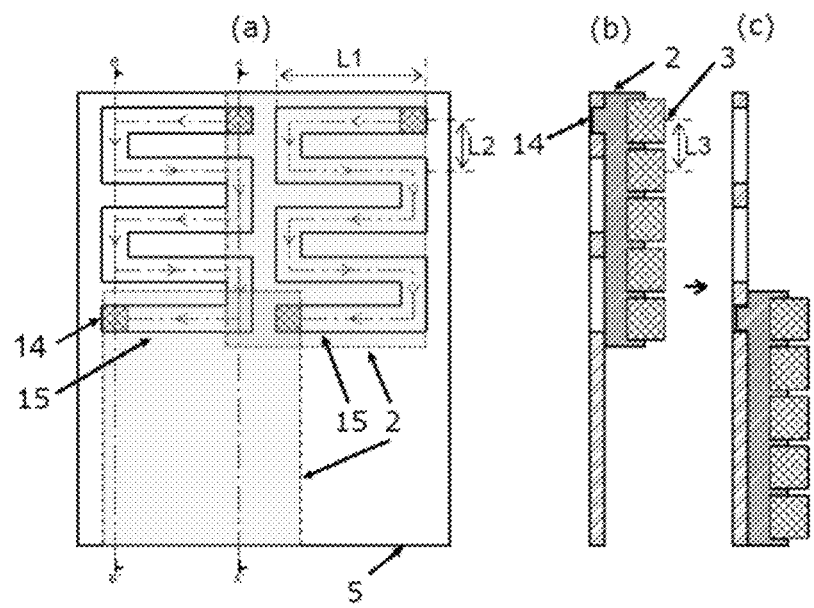
FIG. 4 is a schematic diagram ((a) top view, (b) A-A' cross-sectional view before moving, and (c) B-B' cross-sectional view after moving) of a target fixing jig guide 5 to which the target fixing jig 2 is connected.

In FIG. 4, an arrangement of the target fixing jig 2 and the target fixing jig guide 5 is shown. The guide member 14, at a point of time of starting the production of CNB, is placed at an upper end of the guide rail 15, and travels from an upper end to a lower end of the guide rail 15 as shown by arrows shown in FIG. 4(*a*). In FIG. 4, the target fixing jig 2 has two guide members 14, and the target fixing jig guide 5 has two guide rails 15. By there being two guide members 14 and the guide rails 15, it is possible to install the target fixing jig 2 more stably on the target fixing jig guide 5. However, the number of guide members 14 and the guide rails 15 is not restricted to two, and it may be one for example. Although, the target fixing jig guide 5 in FIG. 4 is in a form of a sheet so as to enable to place the target fixing jig 2 stably, without restricting to this, various forms of the target fixing jig guide 5 may be used. For instance, without making the target fixing jig guide 5 in the form of a sheet, the target fixing jig guide 5 may include only the guide rail 15.

As the target fixing jig 2 moves along the guide rail 15, the guide rail 15 is adapted to the shape and the arrangement of the rod-shaped catalyst-containing carbon target 3 in order that all the rod-shaped catalyst-containing carbon targets 3 are eventually irradiated by the laser light 11. Specifically, the guide rail 15 has a zigzag shape formed by a rail in a transverse direction and a rail in a downward direction being connected alternately at an end portion. This shape is adapted to the plurality of rod-shaped catalyst-containing carbon targets 3 accommodated to be arranged in parallel. For the guide rail 15 to be further adapted to the plurality of rod-shaped catalyst-containing carbon targets 3, it is preferable that the rod-shaped catalyst-containing carbon targets 3 mounted on the target fixing jig 2 are arranged parallel to the rail in the transverse direction of the guide rail 15. A distance L1 of the rail in the transverse direction may be equal to or shorter than or longer than a length of the rod-shaped catalyst-containing carbon target 3. Furthermore, it is preferable that a distance L2 between center lines of the two adjacent rails in the transverse direction is same as a distance L3 between center lines of the two adjacent rod-shaped catalyst-containing carbon targets 3. The guide rail 15 has an inclination in a downward direction, and the target fixing jig 2 to be placed thereon also has an inclination in the downward direction similarly. Accordingly, as the guide member 14 of the target fixing jig 2 enters the rail in the downward direction, the guide member 14, due to a weight thereof, moves downward up to the rail in the transverse direction of the next stage, and the rod-shaped catalyst-containing carbon target 3 to be irradiated by the laser light 11 is switched. By repeating this, it is possible to prepare continuously a product material 10 which includes the CNB semiautomatically. The angle of inclination is not restricted in particular and may be set appropriately. The angle of inclination is in a range of 20 degrees to 90 degrees for example, and preferably in a range of 30 degrees to 60 degrees, and the angle of inclination of 45 degrees is particularly preferable.

The target fixing jig 2 moves in the downward direction of the guide rail 15 due to the weight thereof, whereas, the target fixing jig 2 moves in the lateral direction of the guide rail 15 by the jig for target fixing jig movement 4. In the case where the guide rail 15 has the zigzag shape as shown in FIG. 4, the target fixing jig 2 switches the transverse travelling direction in mid-course, and moves to right and left. The jig for target fixing jig movement 4 can preferably move back and forth so that the target fixing jig 2 is movable on the zigzag-shaped guide rail 15. When the jig for target fixing jig movement 4 advances forward, the target fixing jig 2 moves by being pushed by the jig for target fixing jig movement 4. When the jig for target fixing jig movement 4 moves backward, the target fixing jig 2 moves by being pulled by the jig for target fixing jig movement 4.

Figure 5:
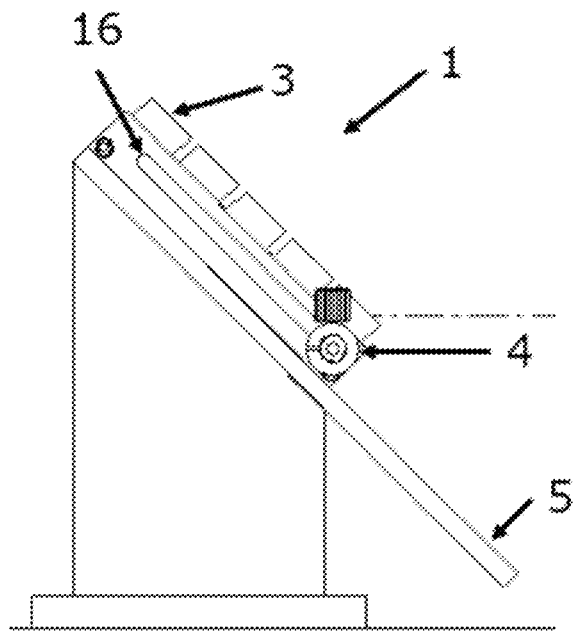
FIG. 5 is a schematic diagram (side view) showing the production member 1 according to the present embodiment.
Figure 6:
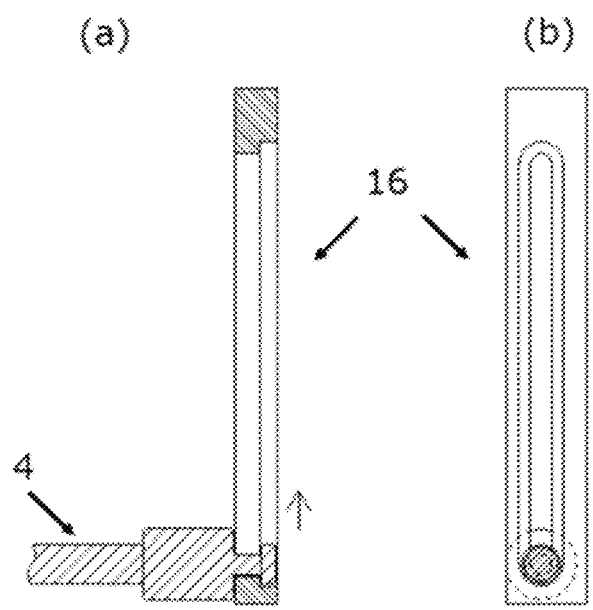
FIG. 6 is a schematic diagram ((a) cross-sectional view and (b) side view) of a jig guide for movement 16.

FIG. 5 shows a side surface of a production member 1 in which the jig for target fixing jig movement 4 and the target fixing jig 2 are connected. A jig guide for movement 16 is provided on a side surface of the target fixing jig 2, and the jig for target fixing jig movement 4 is slidably engaged with the jig guide for movement 16. The jig guide for movement 16 and the jig for target fixing jig movement 4 have a structure such that the jig for target fixing jig movement 4 is not disengaged even when moves back and forth in the transverse direction. A connection mechanism which connects the jig for target fixing jig movement 4 and the target fixing jig 2 is not restricted in particular, and a heretofore known mechanism can be used. As an example of the connection mechanism, a structure of a front end of the jig for target fixing jig movement 4 and the jig guide for movement 16 is shown in FIG. 6. The jig guide for movement 16 is a groove provided along the side surface of the target fixing jig 2. An interior of the jig guide for movement 16 is wider than an opening portion. The front end of the jig for target fixing jig movement 4 is wide, and is engaged at the front end with the interior of the jig guide for movement 16. The front end of the jig for target fixing jig movement 4 being larger than the opening portion of the jig guide for movement 16, cannot be disengaged from the jig guide for movement 16. Accordingly, the jig for target fixing jig movement 4 is capable of pulling the target fixing jig 2. The jig for target fixing jig movement 4 is not thoroughly fixed to the jig guide for movement 16, and is capable of slidably moving relatively with respect to the jig for target fixing jig movement 4 within a range of the jig guide for movement 16. For the target fixing jig 2 to be capable of moving over an entire range of the guide rail 15, it is preferable that a length of the jig guide for movement 16 is not shorter than a length of the guide rail 15 in the downward direction (total distance of the rail in the downward direction). The jig for target fixing jig movement 4 may further be connected to a control section. Accordingly, it is possible to make it a CNB production apparatus on which the production member 1 is to be installed. The control section may have a function of moving the jig for target fixing jig movement 4 in the transverse direction. The control section may have a function of controlling the jig for target fixing jig movement 4 such that, when the guide member 14 has reached an end of the rail in the transverse direction of the guide rail 15, the movement of the jig for target fixing jig movement 4 is stopped till the movement of the guide member 14 in the downward direction is completed. A shape of the jig for target fixing jig movement 4 is not restricted in particular, and is preferable to be a rod shape.

At the time of moving the target fixing jig 2 in the transverse direction by the jig for target fixing jig movement 4, it is preferable to move at a constant speed such that a power density of the laser light 11 irradiated to a surface of the rod-shaped catalyst-containing carbon target 3 becomes substantially constant. At this time, when the moving speed is excessively slow, carbon cannot be evaporated from the rod-shaped catalyst-containing carbon target 3, and is deposited as sediment. This deposit is mainly a graphite and carbon nanotube, and some CNHs is prepared but CNB is hard to be prepared. The details are unrevealed, but it may be possible that the small amount of carbon that has been evaporated is consumed for preparation of the CNHs, and the CNB is hard to be prepared. Moreover, even when the moving speed becomes excessively fast, mainly the CNHs is prepared, and the CNB is hard to be prepared. Therefore, the moving speed is to be set to be the most appropriate according to a laser power, a spot diameter of the laser light 11, and an amount of catalyst. For instance, it is possible to set the moving speed in a range of 0.05 cm/sec to 10 cm/sec.

(Production Apparatus)

FIG. 1 and FIG. 2 are diagrams showing an outline of the production apparatus 6 having the production member 1 installed therein. The production apparatus 6 is an apparatus for producing the product material 10 including the CNB, by evaporating carbon with irradiating the laser light 11 to the rod-shaped catalyst-containing carbon target 3 in a non-oxidizing atmosphere of a gas such as nitrogen and a noble gas (such as Ar). The production apparatus 6 includes a preparation chamber 7 for preparing the CNB. Moreover, the preparation chamber 7 has a laser irradiation window 9 (made of ZnSe for example) for irradiating the laser light 11 from a laser oscillator (for example, carbon dioxide laser oscillator) to the rod-shaped catalyst-containing carbon target 3 in the preparation chamber 7. Moreover, a gas inlet and outlet are connected to the preparation chamber 7, and it is possible to introduce and to discharge the non-oxidizing gas (such as nitrogen gas and a noble gas such as Ar gas) into and from the preparation chamber 7, thereby controlling to a constant flow rate. While the laser light 11 is being irradiated, the target fixing jig 2 connected to the jig for target fixing jig movement 4 moves back and forth in the transverse direction at a constant speed, and the rod-shaped catalyst-containing carbon target 3 is continuously evaporated. Generally, a position at which the laser light 11 is to be irradiated is set to the lowermost rod-shaped catalyst-containing carbon target 3 in the beginning, and irradiating the laser light 11 is started from the lowermost rod-shaped catalyst-containing carbon target 3. With the target fixing jig 2 moving in the transverse direction, the position at which the laser light 11 is irradiated to the lowermost rod-shaped catalyst-containing carbon target 3 moves, and the entire lowermost rod-shaped catalyst-containing carbon target 3 is evaporated. As the target fixing jig 2 reaches the end of the rail in the transverse direction of the guide rail 15, the target fixing jig 2 moves downward, and the position to which the laser light is to be irradiated is switched to the rod-shaped catalyst-containing carbon target 3 positioned second from the bottom. Thereafter, the target fixing jig 2 moves in the transverse direction opposite to that in the beginning, and the position at which the laser light 11 is to be irradiated moves to the rod-shaped catalyst-containing carbon target 3 positioned second from the bottom, thereby evaporating the entire rod-shaped catalyst-containing carbon target 3 positioned second from the bottom. By repeating this, it is possible to produce continuously the product material 10 containing the CNB semiautomatically.

Regarding a pressure inside the preparation chamber 7, generally, it is possible to use a pressure of 3332.2 hPa (10000 Torr) or lower, and the closer the pressure to the vacuum, the easier it is to prepare the carbon nanotube and the CNB cannot be obtained. Using the pressure preferably in a range of 666.61 hPa (500 Torr) to 1266.56 hPa (950 Torr) and more preferably close to a normal pressure (1013 hPa (1 atm 760 Torr)) is suitable for a large-scale synthesis and a cost reduction. It is possible to set the preparation chamber 7 to an arbitrary temperature, and for the large-scale synthesis and the cost reduction, a temperature in a range of 0 to 100° C. is preferable, and a room temperature is more preferable. Inside the preparation chamber 7, the abovementioned atmosphere is achieved by introducing a gas such as nitrogen gas and a noble gas singly or upon mixing. An arbitrary gas flow rate may be used, and a gas flow rate in a range of 0.5 L/min to 100 L/min is suitable. In a process of evaporating carbon, it is preferable to control the gas flow rate to be constant. It is possible to make the gas flow rate constant by adjusting a supply-gas flow rate and an exhaust-gas flow rate. The pressure can be made constant by controlling a rotary pump or a dry pump.

Figure 7:
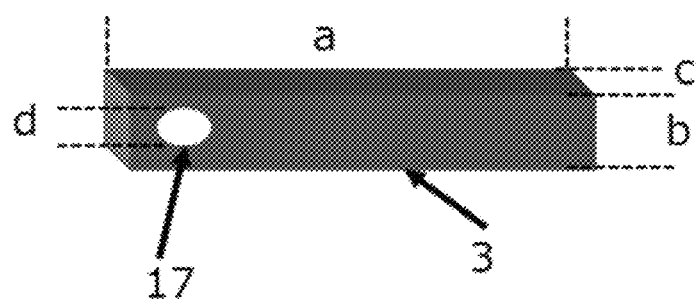
FIG. 7 is a schematic diagram of a rod-shaped catalyst-containing carbon target 3.

A laser spot 17 is formed at a position where the laser light 11 is irradiated. In FIG. 7, the laser light 11 is irradiated to a side surface of the rod-shaped catalyst-containing carbon target 3 having a length a, a width b, and a depth c, and the laser spot 17 having a spot diameter d is formed on the side surface in a direction of width of the rod-shaped catalyst-containing carbon target 3. The width b is set to be larger than the spot dimeter d so that the laser spot 17 is accommodated in an irradiation surface of the rod-shaped catalyst-containing carbon target 3. In the present embodiment, the laser spot 17 at an arbitrary position may be set, but when the laser light 11 is irradiated to a portion below a center of the target irradiation surface, the laser spot 17 is drawn away from the adjacent rod-shaped catalyst-containing carbon target 3 which is not irradiated, and therefore it is preferable in some cases.

In laser ablation, it is possible to use appropriately lasers such as $CO_2$ laser, excimer laser, YAG laser, and semiconductor laser provided that are capable of heating the rod-shaped catalyst-containing carbon target 3 to a high temperature, and $CO_2$ laser which facilitates a high-power is the most suitable. The power of the $CO_2$ laser may be set appropriately, but the power in a range of 1.0 kW to 10 kW is preferable, and the power in a range of 2.0 kW to 5.0 kW is more preferable. When the power is weaker than this, since almost no carbon is evaporated, it is not preferable from a viewpoint of amount prepared. When the power is stronger than this, impurities such as graphite and amorphous carbon increase and therefore it is not preferable. Moreover, the irradiation of the laser light 11 may be either a continuous irradiation or a pulse irradiation. For a large-quantity production, the continuous irradiation is preferable.

Carbon and catalyst are evaporated at the laser spot 17 by the energy imparted from the laser light 11 as mentioned above, and the CNB is prepared. However, also a surrounding portion of the laser spot 17 is affected by heat, and when analyzed after cooling, it is confirmed that a carbonaceous crystalline state and a distribution of a catalytic metal have changed (called as an affected zone).

Once it becomes an affected zone, the CNB is not prepared from that portion. Therefore, it is preferable that the generation of the affected zone is small. For using the rod-shaped catalyst-containing carbon target 3 effectively by reducing the affected zone, it is preferable to adjust appropriately a size (length, width, and depth) of the rod-shaped catalyst-containing carbon target 3 according to a size (spot diameter) of the laser spot 17. In a case where the rod-shaped catalyst-containing carbon target 3 has a rectangular column shape, the width and the depth are determined by a surface to which the laser light 11 is irradiated. A short side of a surface to which the laser light 11 is irradiated is let to be the width of the rod-shaped catalyst-containing carbon target 3. Moreover, a length in a direction perpendicular to a surface to which the laser light 11 is irradiated is let to be the depth. In a case where the rod-shaped catalyst-containing carbon target 3 has a circular cylindrical shape, a diameter of the circular cylinder is let to be the width and the depth.

The spot diameter of the laser light 11, particularly the spot diameter in the direction of width, is normally selected such that an irradiated area becomes approximately 0.02 $cm^2$ to 2 $cm^2$. Here, it is possible to control the irradiated area by a degree of the laser power and focusing of light at a lens. In a case of describing simply as "spot diameter", the "spot diameter" signifies an average diameter of the laser spot 17 (a circle or an ellipse) when the laser light 11 is irradiated perpendicularly to a point on a surface forming a typical flat surface. In a case in which, the surface of the rod-shaped catalyst-containing carbon target 3 is not a flat surface, or in a case in which, a surface of the rod-shaped catalyst-containing carbon target 3 is tilted, the shape of the laser spot 17 becomes substantial elliptical for example, and not circular, and a minor axis passing through a spot center of the laser light 11 is almost equivalent to a diameter of the circle. In a case of such spot diameter of the laser light 11, it is preferable to set a width of the rod-shaped catalyst-containing carbon target 3 (FIG. 7b) to a width in a range of 10 mm to 100 mm. Moreover, although a depth of the rod-shaped catalyst-containing carbon target 3 (FIG. 7c) may be set to an arbitrary value, it is preferable to set the depth such that the entire carbon of the laser spot 17 is evaporated by irradiating the laser light 11 once, and it is preferable to set the depth in a range of 10 mm to 100 mm.

The length of the rod-shaped catalyst-containing carbon target 3 (FIG. 7a) may be adjusted appropriately according to production conditions etc. Generally, when the length of the rod-shaped catalyst-containing carbon target 3 is long, it is possible to produce the CNB continuously and to improve the production efficiency. In one embodiment, the length is preferably 50 mm or more, and more preferably 60 mm or more. In one embodiment, the length is preferably 1000 mm or less. In one embodiment, the length is in a range of 50 mm to 700 mm.

Generally, for the rod-shaped catalyst-containing carbon target 3, a proportion of the length with respect to the width or the depth may be appropriately adjusted, and the preferable proportion is 4 or more, more preferably 10 or more. Generally, the proportion of the length with respect to the width or the depth is 100 or less.

When the laser light 11 is irradiated to the rod-shaped catalyst-containing carbon target 3, the rod-shaped catalyst-containing carbon target 3 is heated, and a plume (emission of light) is generated from the surface of the rod-shaped catalyst-containing carbon target 3, and carbon is evaporated. At this time, when the laser light 11 making an angle of 45 degrees with the surface of the rod-shaped catalyst-containing carbon target 3 is irradiated, the plume is generated in a direction perpendicular to the surface of the rod-shaped catalyst-containing carbon target 3. It is preferable to adjust a position of the rod-shaped catalyst-containing carbon target 3 and a direction of irradiation of the laser light 11 such that the laser light 11 does not hit the plume, and does not pass through a portion other than the rod-shaped catalyst-containing carbon target 3.

(Additional Treatment)

The CNB thus obtained can be further subjected to an additional treatment such as a hole-opening treatment, if necessary.

It is possible to open fine holes in a single-walled carbon nanohorn in the CNB by an oxidizing treatment. The oxidizing treatment forms surface functional groups containing oxygen on open hole portions. For the oxidizing treatment, a gas-phase process and a liquid-phase process can be used. In the case of the gas-phase process, the process is carried out by heat treatment in a gas atmosphere containing oxygen, such as air, oxygen, and carbon dioxide. And among these, air is suitable from a cost point of view. Moreover, a temperature in a range of 300° C. to 650° C. is preferable, and a temperature in a range of 400° C. to 550° C. is more preferable. At a temperature of 300° C. or higher, carbon burns, thereby making it possible to form the holes assuredly. At a temperature of 650° and lower, burning of the whole CNB can be suppressed. In a case of the liquid-phase process, the treatment is carried out in a liquid containing an oxidizing agent such as nitric acid, sulfuric acid, and hydrogen peroxide. In a case of nitric acid, it is possible to use in a temperature range of room temperature to 120° C. With the temperature being 120° C. or lower, no oxidation more than necessary occurs. In a case of hydrogen peroxide, it is possible to use in a range of room temperature to 100° C., and temperature of 40° C. or higher is more preferable. In a temperature range of 40° C. to 100° C., open holes can be formed efficiently. In the liquid-phase process, using light irradiation in combination is even more effective.

The catalytic metal contained in the CNB may be removed as required. The catalytic metal can be removed since it is dissolved in nitric acid, sulfuric acid or hydrochloric acid. From an ease-of-use point of view, hydrochloric acid is suitable. The temperature for dissolving the catalyst may suitably be selected, but when it is intended to sufficiently remove the catalyst, it is desirable to carry out by heating to a temperature of 70° C. or higher. In a case of using nitric acid or sulfuric acid, it is possible to carry out the catalyst removal at the same time as forming the open holes, or after forming the open holes. Since the catalyst is covered by a carbon coating in some cases, it is desirable to heat at a temperature of about 300° C. to 500° C.

The CNB thus obtained can be improved in crystallinity by performing heat treatment in a non-oxidizing atmosphere such as an inert gas, nitrogen, hydrogen, vacuum and the like. A heat-treatment temperature may be in a range of 800° C. to 2000° C., but is preferably 1000° C. to 1500° C. After the hole-opening treatment, surface functional groups containing oxygen have been formed on open hole portions, but the functional groups can also be removed by a heat treatment. The heat-treatment temperature may be in a range of 150° C. to 2000° C. In order to remove carboxyl groups, hydroxyl groups and the like being the surface functional groups, 150° C. to 600° C. is desirable. In order to remove carbonyl groups being the surface functional group, 600° C. or higher is desirable. The surface functional group can be removed by being reduced in a gaseous atmosphere or a liquid atmosphere. For the reduction in a gas atmosphere, hydrogen can be used, and the treatment can also serve as the above treatment for improving crystallinity. In the liquid atmosphere, hydrazine and the like can be used.

A mixture of the CNB and the CNHs can be used as it is, or upon isolating the CNB. It is preferable to use the mixture as it is.

EXAMPLES

The present invention will be described below in further details by showing examples. As a matter of course, the present invention is not restricted by the examples described below.

Example 1

Nitrogen gas was flown into the production apparatus 6 at a rate of 10 L/min, and the pressure was controlled in a range of 700 Torr to 950 Torr. Five rod-shaped catalyst-containing carbon targets 3 having a quadrangular pillar shape (width: 17 mm, depth: 15 mm, length: 70 mm, bulk density: approximately 1.4 g/cm$^3$, thermal conductivity: approximately 5 W/(m·K)) containing 1 at. % of iron were installed on the target fixing jig 2 (made of stainless steel) inside the production apparatus 6. The target fixing jig 2 was connected to the jig for target fixing jig movement 4, and was disposed on the target fixing jig guide 5. At this time, the laser irradiation position was set to the lowermost rod-shaped catalyst-containing target 3. While moving the rod-shaped catalyst-containing targets 3 in the transverse direction at the speed of 0.15 cm/sec, $CO_2$ laser light was irradiated continuously for 30 seconds. Thereafter, the target fixing jig 2 reached the end portion of the guide rail 15, and the target fixing jig 2 moved down along the guide rail 15 automatically due to the weight thereof, and the rod-shaped catalyst-containing carbon target 3 positioned second from the bottom was disposed at the laser irradiation position. Once again, the $CO_2$ laser light was irradiated continuously for 30 seconds. The abovementioned operation was repeated and five rod-shaped catalyst-containing carbon targets 3 were evaporated. As a result, about 1 g of carbon powder was prepared. The laser power was adjusted to 3.2 kW and the spot diameter was adjusted to 1.5 mm. The temperature in the preparation chamber 7 was room temperature.

Figure 8:
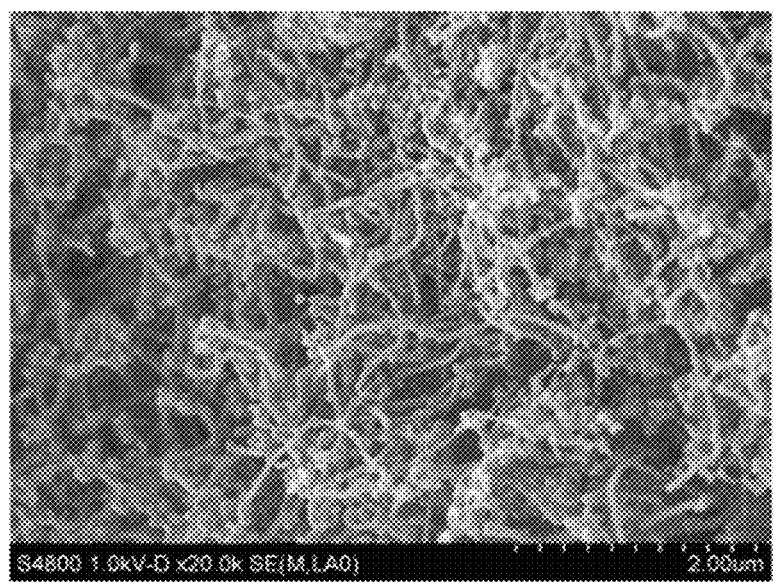
FIG. 8 is an SEM photograph of a product material 10 obtained in Example 1.
Figure 9:
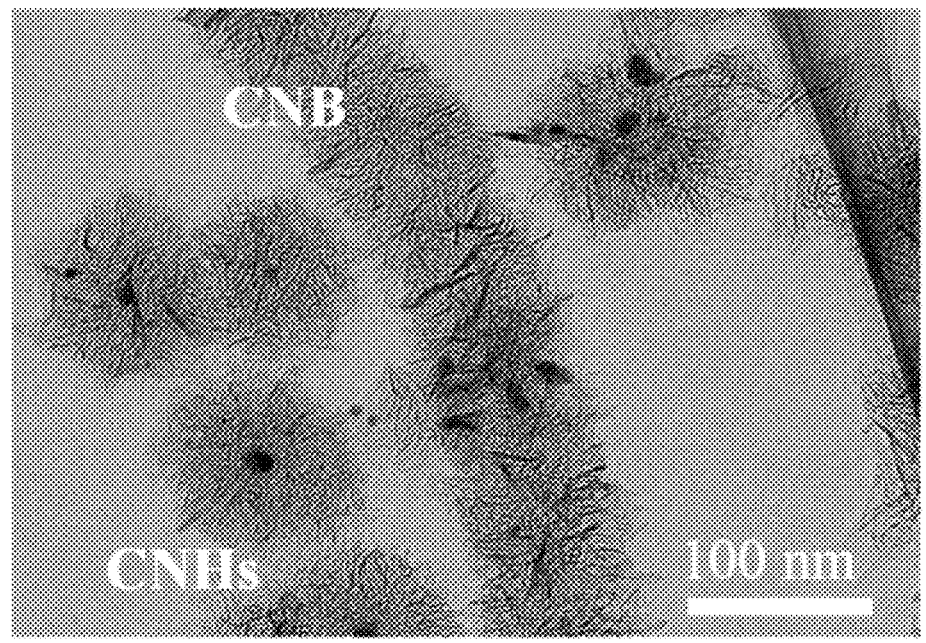
FIG. 9 is a TEM photograph of the product material 10 obtained in Example 1.

FIG. 8 is an SEM photograph of the product material 10 obtained. Fibrous structures and spherical structures were observed. It was revealed that the product material 10 contained extremely large number of fibrous structures. FIG. 9 is a TEM photograph of the product material 10 obtained. The fibrous structures and the spherical structures were of the CNB and the CNHs respectively. In the CNB, single-walled carbon nanohorns having a diameter in a range of 1 nm to 5 nm and a length in a range of 40 nm to 50 nm were aggregated in a fibrous form. The CNB had a diameter in a range of 30 nm to 100 nm and a length in a range of several μm to several tens of μm. The black linear structures found in the CNB and the CNHs are structures when a graphene sheet (petal) was viewed from an end. Moreover, black particles are of catalytic metal (Fe).

Comparative Example 1

Figure 10:
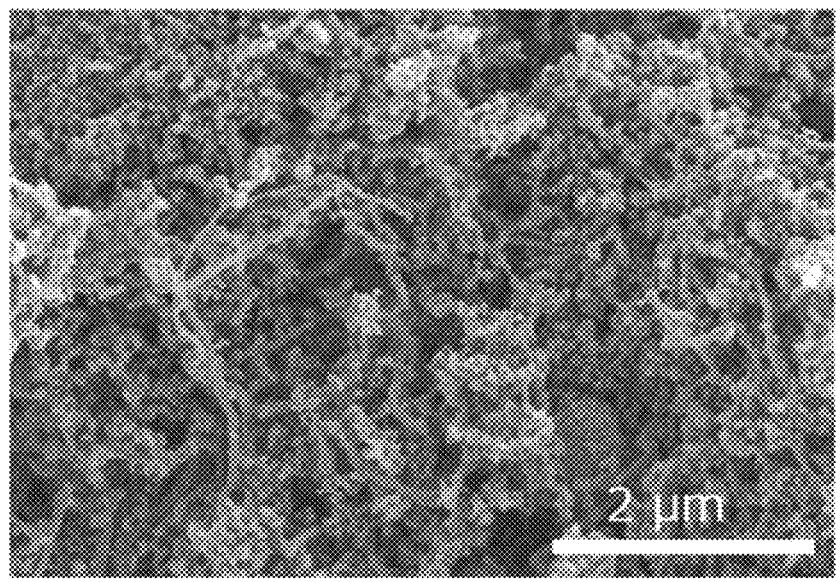
FIG. 10 an SEM photograph of the product material 10 obtained in Comparative Example 1.

Nitrogen gas was flown into the preparation chamber 7 at a rate of 10 L/min, and the pressure was controlled in a range of 700 Torr to 950 Torr. In this preparation chamber 7, while rotating a circular cylindrical shaped carbon target (diameter: 30 mm, length: 50 mm, bulk density: approximately 1.4 g/cm$^3$, thermal conductivity: approximately 5 W/(m·K)) containing 1 at. % of iron at a speed of 1 rpm (linear speed: 0.15 cm/sec), $CO_2$ laser light was irradiated continuously for 30 seconds. The laser power was adjusted to 3.2 kW, the spot diameter was adjusted to 1.5 mm, and an angle of irradiation with the spot as a center was adjusted to 45 degrees. The temperature in the preparation chamber 7 was room temperature. FIG. 10 is an SEM photograph of the product material 10 obtained. Fibrous structures and spherical structures were observed. However, it was revealed that the number of fibrous structures was smaller as compared to those in the product material 10 of Example 1.

This application is based upon and claims the benefit of priority from Japanese patent application No. 2019-012995, filed on Jan. 29, 2019, the disclosure of which is incorporated herein in its entirety.

While the invention has been described with reference to example embodiments and examples thereof, the invention is not limited to the above example embodiments and examples. Various changes that can be understood by those skilled in the art may be made to the configuration and details of the invention within the scope of the present invention.

EXPLANATION OF REFERENCE 1 production member
2 target fixing jig 3 rod-shaped catalyst-containing carbon target
4 jig for target fixing jig movement
5 target fixing jig guide
6 production apparatus
7 preparation chamber
8 target setting screw
9 laser irradiation window
10 product material
11 laser light
12 target housing section
13 partition
14 guide member
15 guide rail
16 jig guide for movement
17 laser spot
L1 distance of the rail in transverse direction
L2 distance between center lines of rails in transverse direction
L3 distance between center lines of rod-shaped catalyst-containing carbon targets

What is claimed is:

1. A carbon nanohorn aggregate production member for producing a fibrous carbon nanohorn aggregate in which single-walled carbon nanohorns are aggregated radially and are connected in a fibrous form, comprising:
    a target fixing jig having (i) a target housing section on an upper surface which has a partition and is capable of mounting a plurality of rod-shaped catalyst-containing carbon targets without making a mutual contact, and (ii) a jig guide for movement on a side surface;
    a jig for target fixing jig movement which is slidably engaged with the jig guide for movement; and
    a target fixing jig guide which is inclined downward, and is equipped with a guide rail which is adapted to an arrangement of the plurality of rod-shaped catalyst-containing carbon targets, wherein
    the target fixing jig is slidably engaged with the guide rail, and moves in a downward direction by a weight thereof and in a transverse direction along the guide rail by the jig for target fixing jig movement.

2. The production member according to claim 1, wherein the guide rail is a rail in a zig-zag form which is formed by a rail in a transverse direction and a rail in a downward direction by being connected alternately.

3. The production member according to claim 2, wherein a distance between center lines of the two adjacent rails in the transverse direction is same as a distance between center lines of two adjacent rod-shaped catalyst-containing carbon targets.

4. The production member according to claim 1, wherein a width and a depth of the rod-shaped catalyst-containing carbon target are in a range of 10 mm to 100 mm, and a length of the rod-shaped catalyst-containing carbon target is in a range of 50 mm to 70 mm.

5. A production method for producing a carbon nanohorn aggregate including fibrous carbon nanohorn aggregate in which single-walled carbon nanohorns are aggregated radially and are connected in a fibrous form, comprising:
    a step (a) of mounting a plurality of rod-shaped catalyst-containing carbon targets on a target fixing jig having (i) a target housing section on an upper surface which has a partition and is capable of mounting a plurality of rod-shaped catalyst-containing carbon targets without making a mutual contact, and (ii) a jig guide for movement on a side surface;
    a step (b) of fixing end portions of the plurality of rod-shaped catalyst-containing carbon targets to the target fixing jig;
    a step (c) of connecting the jig guide for movement on the side surface of the target fixing jig and a jig for target fixing jig movement;
    a step (d) of installing the target fixing jig on the target fixing jig guide which is inclined downward, and is equipped with a guide rail which is adapted to an arrangement of the plurality of rod-shaped catalyst-containing carbon targets;
    a step (e) of irradiating laser light to one of the rod-shaped catalyst-containing carbon targets; and
    a step (f) of moving the target fixing jig along the guide rail by the jig for target fixing jig movement, thereby moving a position at which the laser light is irradiated on the rod-shaped catalyst-containing carbon target so that all of the plurality of rod-shaped catalyst-containing carbon targets are irradiated with the laser light.

6. The production method according to claim 5, wherein a width and a depth of the rod-shaped catalyst-containing carbon target are in a range of 10 mm to 100 mm, and a length of the rod-shaped catalyst-containing carbon target is in a range of 50 mm to 70 mm.

* * * * *